US 8,035,839 B2

(12) United States Patent
Shaw

(10) Patent No.: US 8,035,839 B2
(45) Date of Patent: Oct. 11, 2011

(54) DOCUMENT PROCESSING SYSTEM PROVIDING JOB ATTRIBUTE CONTROL FEATURES AND RELATED METHODS

(75) Inventor: Geoffrey Howard Shaw, Webster, NY (US)

(73) Assignee: Pharos Systems International, Inc., DE (US)

( * ) Notice: Subject to any disclaimer, the term of this patent is extended or adjusted under 35 U.S.C. 154(b) by 898 days.

(21) Appl. No.: 11/971,290

(22) Filed: Jan. 9, 2008

(65) Prior Publication Data

US 2008/0204793 A1      Aug. 28, 2008

Related U.S. Application Data

(60) Provisional application No. 60/884,055, filed on Jan. 9, 2007.

(51) Int. Cl.
*G06K 15/00* (2006.01)
*G06F 3/12* (2006.01)

(52) U.S. Cl. .......................... 358/1.15; 358/1.9; 358/2.1

(58) Field of Classification Search ................ 358/443, 358/448, 444, 404, 2.1, 1.9, 1.15, 1.16, 1.18
See application file for complete search history.

(56) References Cited

U.S. PATENT DOCUMENTS

| 5,625,757 | A  | * | 4/1997  | Kageyama et al. | 358/1.14 |
| 6,157,768 | A  | * | 12/2000 | Hashimoto et al. | 386/326 |
| 6,334,717 | B1 |   | 1/2002  | Uchida et al. | 395/109 |
| 6,807,388 | B1 |   | 10/2004 | Kojima et al. | 399/80 |
| 2003/0018900 | A1 |   | 1/2003  | Endoh | 713/182 |
| 2003/0182368 | A1 |   | 9/2003  | Horiyama | 709/203 |
| 2005/0286688 | A1 | * | 12/2005 | Scherer | 379/88.21 |
| 2006/0019632 | A1 | * | 1/2006  | Cunningham et al. | 455/408 |
| 2007/0024895 | A1 | * | 2/2007  | Clark | 358/1.15 |
| 2007/0240161 | A1 | * | 10/2007 | Prabhakar et al. | 718/104 |
| 2010/0110459 | A1 | * | 5/2010  | Yamada | 358/1.9 |

FOREIGN PATENT DOCUMENTS

EP        1696311        8/2006

OTHER PUBLICATIONS

HP Color Access Control Features, Hewlett-Packard, 2005.

* cited by examiner

*Primary Examiner* — Jerome Grant, II
(74) *Attorney, Agent, or Firm* — Allen, Dyer, Doppelt, Milbrath & Gilchrist, P.A.

(57) ABSTRACT

A document processing system may include at least one document processing device for performing document processing jobs. A controller connected to the at least one document processing device may be for recording job attribute usage history based upon document processing jobs performed by the at least one document processing device with a job attribute, and selectively restricting processing of new print jobs by the at least one document processing device with the job attribute based upon the recorded job attribute usage history exceeding a job attribute control threshold.

28 Claims, 5 Drawing Sheets

DOCUMENT PROCESSING SYSTEM PROVIDING JOB ATTRIBUTE CONTROL FEATURES AND RELATED METHODS

RELATED APPLICATION

This application is based upon prior filed co-pending provisional application Ser. No. 60/884,055 filed Jan. 9, 2007, the entire subject matter of which is incorporated herein by reference in its entirety.

FIELD OF THE INVENTION

The present invention relates to document processing and reproduction systems, and, more particularly, to copy, print, and/or scanner control systems and related methods, for example.

BACKGROUND OF THE INVENTION

With the advancement in document printing devices over the past several years, users now have access to advanced printing options that formerly were available only through specialized print shops. For example, multi-function devices (MFDs) with optical scanning and printing capabilities are now available that can be connected to a computer network to not only allow printing of documents generated by computers connected to the network, but also printing of documents that are scanned on the scanner. Moreover, such MFDs may also allow for advanced job attributes to be selected for print jobs, such as color printing, binding, and different paper sizes from different paper trays or a manual feed point.

However, with this increased functionality also comes increased costs. Color copies can be significantly more expensive that traditional black and white copies, particularly in the case of color laser copiers. Thus, it may not always be desirable for an organization to give its employees or system users unfettered access to relatively expensive job attributes, as this may impose a significant increase in printing costs from unessential use of the enhanced attributes. Yet, different users within an organization may have a legitimate need for use of the enhanced job attributes, but individually authorizing the use of such resources on a case-by-case basis may be particularly burdensome and likely untenable in larger organizations where numerous print jobs are performed.

As such, certain attempts have been made to provide some flexibility as to when enhanced job attributes, such as color copying, are permitted, to reduce unessential or unauthorized resource use. By way of example, in a brochure entitled "HP color access control features" by the Hewlett-Packard Development Company, L.P., Nov. 22, 2005, color access control features that may be used in conjunction with certain HP printers are discussed. Color printing on the select printers may be enabled or disabled by individual users or groups, as well as by specific applications like Web browsers to help prevent users from wasting color on jobs that should be output in black and white. Pre-configured monochrome-only print drivers may also be deployed on the printers, enforced limits may be set on how many pages each user can print and copy for a given job, and color printing may also be limited based on workgroup and departmental needs.

While such color access control capabilities may be helpful, much of this control capability in the above-described approach rests with the individual printers. That is, the device stores a limited number of users or applications for which color is enabled/disabled, for example. Yet, further flexibility and functionality may be desirable for enabling/disabling color printing or other enhanced job attribute features in some applications. Moreover, it may also be desirable to control the use of such attribute with respect to scanning and/or other document processing operations.

SUMMARY OF THE INVENTION

In view of the foregoing background, it is therefore an object of the present invention to provide a system and related methods for providing improved control over document processing job attributes.

This and other objects, features, and advantages are provided by a document processing system which may include at least one document processing device for performing document processing jobs. Moreover, a controller connected to the at least one document processing device may be for recording job attribute usage history based upon document processing jobs performed by the at least one document processing device with a job attribute, and selectively restricting processing of new document processing jobs by the at least one document processing device with the job attribute based upon the recorded job attribute usage history exceeding a job attribute control threshold. As such, greater flexibility is provided for determining when to restrict usage of the job attribute based upon a history of prior usage, rather than simply based upon a currently requested job with no regard to prior processing.

In accordance with one embodiment, the job attribute usage history may include a project type associated with respective document processing jobs, and the job attribute control threshold may comprise a project output limit. Also, the job attribute usage history may include a number of times a given document processing job has been processed with the job attribute, and the job attribute control threshold may comprise an individual job output limit. Additionally, the job attribute usage history may include a number of times the job attribute has been selected by a given user, and the job attribute control threshold may comprise a user job attribute selection limit. In some instances, the job attribute usage history may include a number of times a user has processed a given print job, and the job attribute control threshold may accordingly comprise a user job limit. In accordance with another example, the job attribute usage history may include a number of times a document processing job is processed during a time period, and the job attribute control threshold may comprise a time period output limit.

By way of example, the controller may be a print control server, and the at least one document processing device may include a plurality of document printing devices connected together with the print control server in a network. The controller may further store restricted document processing jobs having the job attribute in a queue for processing at a later time. In some embodiments, the at least one document processing device may include a scanner. In accordance with another example, at least one computer may be connected with the controller and the at least one document processing device in a network for generating document processing jobs. By way of example, the job attribute may include at least one of color processing, binding, and paper size.

Related computer-readable medium and method aspects are also provided. The method may include generating document processing jobs to be performed by at least one document processing device, and recording job attribute usage history based upon document processing jobs performed by the at least one document processing device with a job attribute. The method may further include selectively restricting processing of new document processing jobs by the at least one document processing device with the job attribute based upon the recorded job attribute usage history exceeding a job attribute control threshold.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
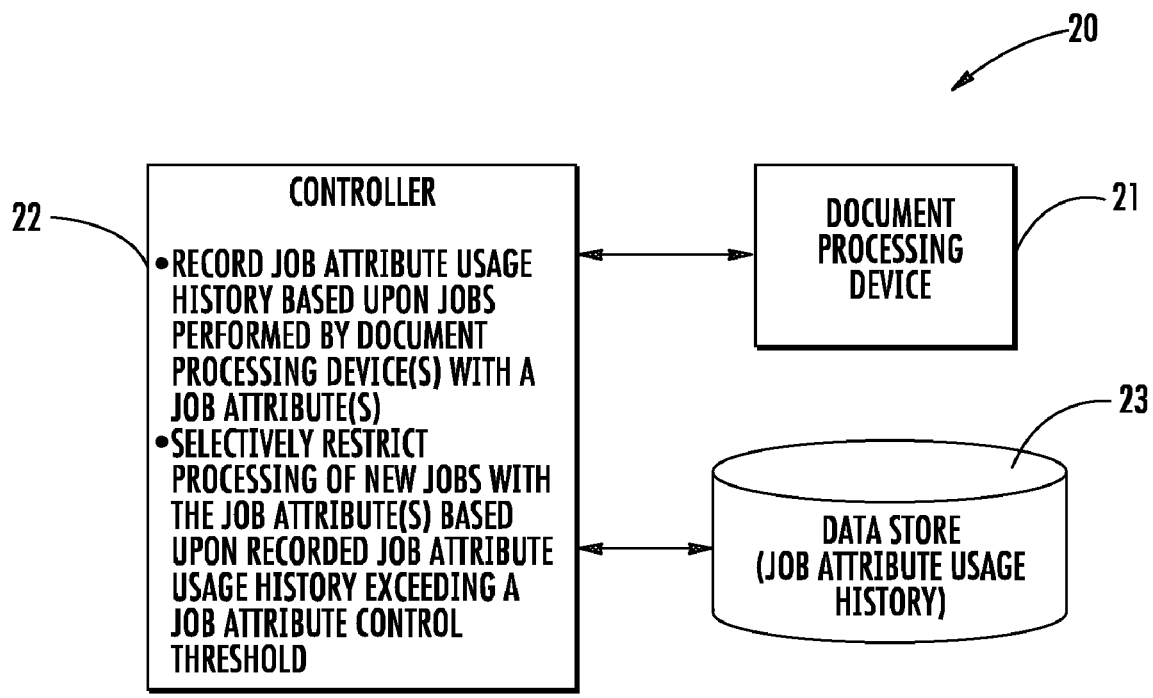
FIG. 1 is a schematic block diagram of a document processing system providing job attribute control features in accordance with the invention.
Figure 2:
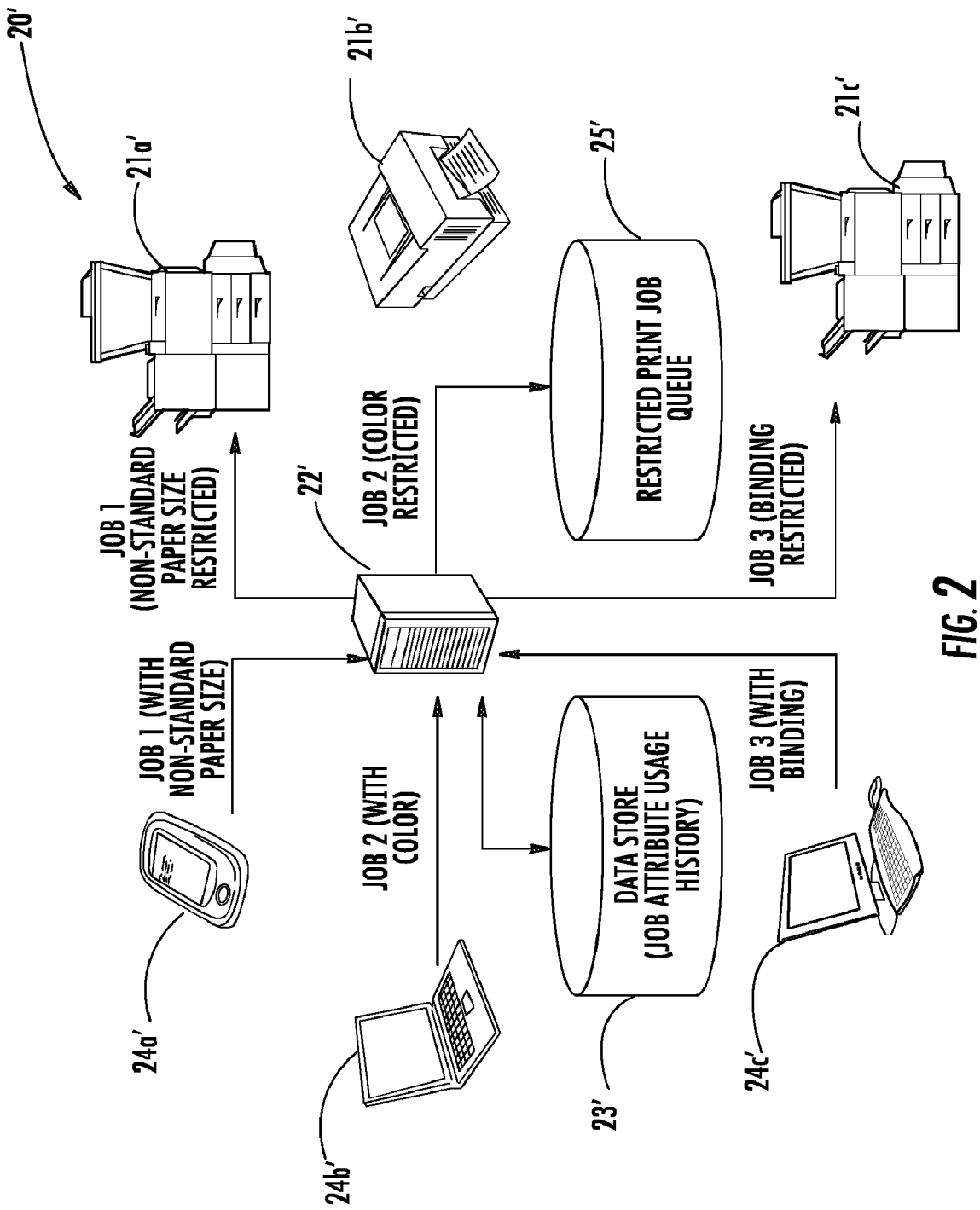
FIG. 2 is an alternate embodiment of the document processing system of FIG. 1.
Figure 3:
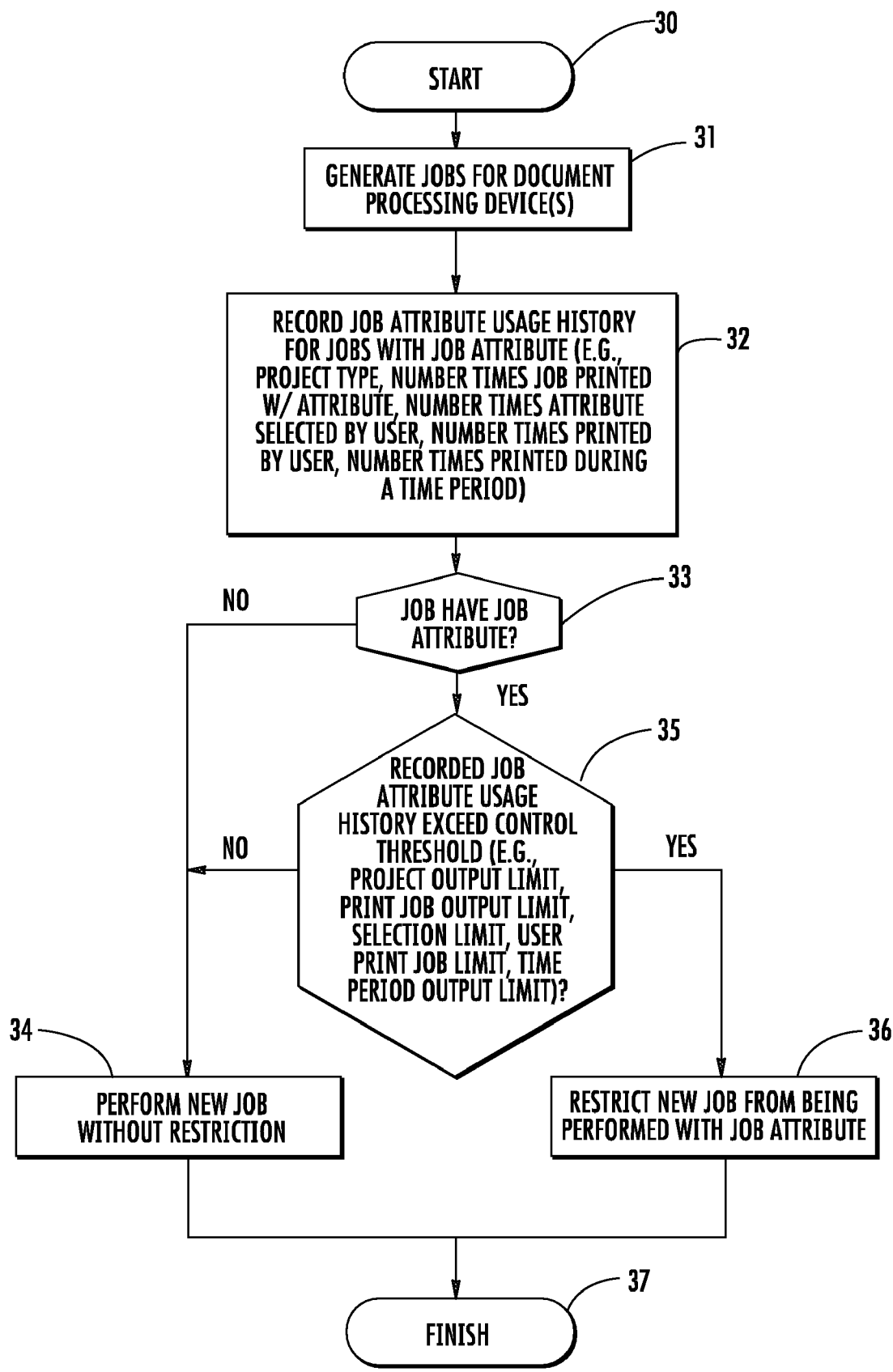
FIG. 3 is a flow diagram illustrating document processing method aspects of the system of FIG. 1.

Turning first to FIGS. 1 through 3, a document processing system 20 and related method aspects are first described. The system 20 illustratively includes one or more document processing devices 21 for performing document processing jobs, such a printers, fax machines, multi-function devices (MFDs), scanners, etc. Generally speaking, the system 20 allows for restrictions to be placed on the job attributes used during document processing, e.g., printing, scanning, etc. For clarity of explanation, the restriction operations will be described below in the context of print jobs. However, it will be appreciated by those skilled in the art that many of the same criteria used to restrict usage of particular print job attributes (e.g., color printing, page size, etc.) may similarly be used to restrict the use of such attributes for scanning, etc. (e.g., color scanning, page size, etc.).

As used herein, "print job" may include any job that is printed by a document processing/printing device irrespective of the origin or source of the job. That is, a print job may be originated or generated (Blocks 30-31) by a computer coupled to the network, an optical scanner that is either in the same housing as the printing device (e.g., a copier or MFD) or remotely located from the printing device, etc., as will be appreciated by those skilled in the art.

A controller 22 is illustratively connected to the document processing device(s) 21. As shown in the example of FIG. 2, the controller 22' is a network print server which has a print control application running thereon to perform the various print control functions discussed herein, as will also be appreciated by those skilled in the art. However, other print controller arrangements may also be used in other embodiments. For example, the controller 22 could be a computer(s) connected to the document processing device(s) 21 that also generates print jobs. That is, the printing program (e.g., word processor, etc.) may reside on the same computer as the print control program. Also in the example illustrated in FIG. 2, multiple document printing devices are provided including a color printer 21b' and MFDs/copiers 21a', 21c' (which may or may not print in color) although other numbers and types of printing devices may be used in different embodiments. The controller 22 may also perform additional functions, such as print/copy/scan monitoring/tracking and accounting based upon usage, etc., as will be appreciated by those skilled in the art.

The controller 22 is advantageously for recording job attribute usage history based upon document processing jobs performed by the document processing device(s) 21 with a particular job attribute(s), such as color printing, binding, a non-standard paper size (e.g., A4 instead of letter, etc.), at Block 32. In the illustrated example, the job attribute usage history may be stored in a data store (e.g., database) 23. More particularly, the job attribute usage history may include such information as project types associated with respective print jobs, a number of times a given print job has been printed with a given job attribute, a number of times the job attribute has been selected (e.g., by a particular user or group), a number of times a user has printed a particular job, a number of times a given print job is carried out during a given time period, etc., as will be discussed further below.

By keeping a history or record of job attribute usage for a given job attribute for which it is desired to maintain control, the controller 22 may selectively restrict printing of new print jobs by the document processing device(s) 21 with the job attribute based upon the recorded job attribute usage history exceeding a job attribute control threshold, at Block 35. That is, if a new job to be printed does not have a given job attribute associated therewith (e.g., the user has not requested color printing, binding, non-standard paper size, etc.), then the job may be allowed to proceed to print as requested, at Blocks 33-34, thus concluding the illustrated method (Block 37). However, if the particular print attribute(s) is requested, then the controller 22 determines if the relevant job attribute usage history has exceeded a job attribute control threshold, and will accordingly restrict unnecessary or unauthorized printing using the particular job attribute.

By way of example, the job attribute control threshold may include a project output limit to thereby limit the overall number of color copies, bound documents, etc., for a given project within the desired threshold (which may be set by a system administrator, manager with appropriate permission level, etc.). Another example is an individual print job output limit to limit the number of times a given print job (i.e., document) can be printed with the particular job attribute (e.g., a document may only be printed in color ten times or less). Similarly, the threshold may be a number of times a given user has selected the particular job attribute (e.g., a user may only select ten documents for color printing).

Still further, the threshold may be a user print job limit (e.g., a user is limited to printing a particular job/document ten times with the attribute, and otherwise can only print the document without the attribute). Yet another exemplary threshold is a time period limit, so that the document can only be printed with the particular attribute within a given period of time, as will be discussed further below. Of course, various combinations of these (and other) job attribute usage history and control thresholds may also be used. Thus, by using the job attribute usage history to determine which jobs to restrict the use of particular job attributes, greater flexibility is provided with respect to a simple enable/disable list based upon user, group, or application type that generated the print job. That is, the controller 22 provides enhanced ability to control attribute usage, such as allowing users to print with an attribute within moderate limits, rather than implementing a blanket prohibition against the user printing (or other document processing operations such as scanning) with the attribute at all.

In accordance with another example, one or more computing devices, such as a personal digital assistant (PDA) 24a', laptop 24b', personal computer 24c', etc., may be connected with the print control server 22' and the document printing devices 21a'-21c' in the network for generating print jobs, although jobs may again be generated from optical scanners (either as stand-alone scanner or as part of an MFD/copier/fax machine, etc.), as noted above. In the case of a print job generated by a scanner (e.g., a copy job), the user may be prompted for a user and/or project ID upon initiating the job, which the print control server 22' uses to determine and record the appropriate job attribute usage history (and whether to restrict performing of the print job with the job attribute accordingly). For the networked computers 21a'-21c' (which may be connected to the network via wired or wireless communications links, as will be appreciated by those skilled in the art), the print control server 22' may know user IDs from login information, and determine other relevant job information from job header information, document storage database information, etc., to thereby record the appropriate job attribute usage information and determine whether attribute restriction is appropriate, as will also be appreciated by those skilled in the art.

The print control server 22' advantageously has the flexibility to provide multiple options for dealing with print jobs that are to be restricted from printing with a given attribute. For example, the print controller 22' may allow the job to proceed to print at the designated printing device 21' (or another device) but without the selected attribute. In the example of FIG. 2, a user sends job 1 from the PDA 24a' to the MFD 21a' with a request for non-standard paper (e.g., A4 instead of 8½×11), but the print control server 22' determines the user's A4 usage has exceeded his A4 threshold limit, and therefore sends the job to the printer 21a' for printing but with A4 restricted, i.e., with a designation to print on 8½×11 instead of A4. Similarly, a user sends job 3 from the PC 24c' to the MFD 21c' with a request for binding, but the print control server 22' instead restricts binding, i.e., allows the job to be printed but without binding, based upon the relevant binding usage history associated with the user, document, etc.

Additionally, print jobs restricted from printing with the particular job attribute may be stored in a queue 25' for printing at a later time. For example, a user sends job 2 to the color printer 21b' for printing in color, but the print controller 22' determines color usage is to be restricted based upon the relevant color usage history and threshold. The job 2 is then "diverted" to the restricted print job queue 25' where it is stored. The user may be notified that the job could not be printed with the desired attribute, and the user is given the option to designate that the attribute be removed so the document can proceed to print (e.g., in black and white), wait until a later time when authorized to print with the attribute, get an authorization from a manager, etc. who is authorized to release the job for printing with the attribute, etc., as will be discussed further below.

Figure 4:
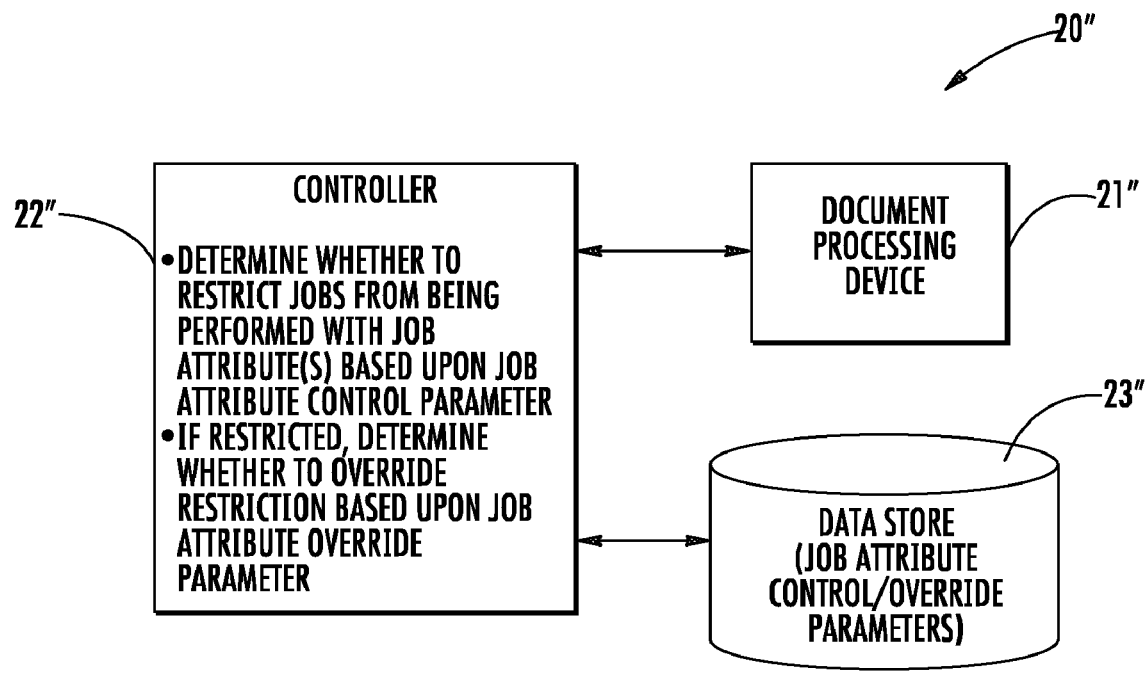
FIG. 4 is a schematic block diagram of an alternate document processing system in accordance with the invention.
Figure 5:
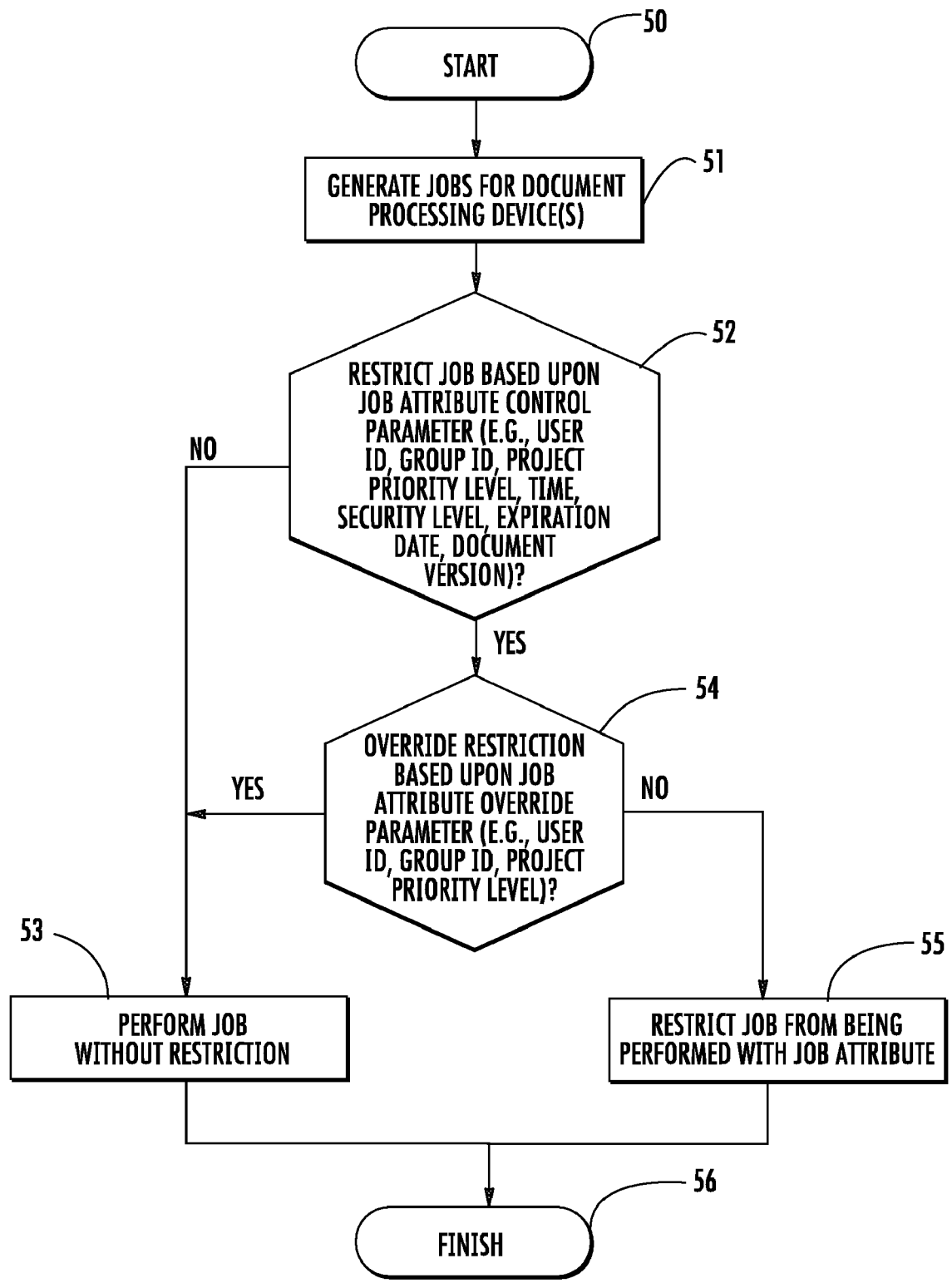
FIG. 5 is a flow diagram illustrating document processing method aspects of the system of FIG. 4.

Turning additionally to FIGS. 4 and 5, additional job attribute control aspects are now described with reference to the document processing system 20". In the present example, the controller 22" advantageously determines whether to restrict generated document processing jobs from being performed by the document processing device(s) 21" with a particular job attribute(s) based upon a job attribute control parameter, at Blocks 50-52. By way of example, the job attribute control parameter may include a user identifier (ID), a group ID, a project priority level associated with the print job, a time of processing, a document security level associated with the document processing job, an expiration date associated with the document processing job, and/or a document version associated with the document processing job, as will be discussed further below. If there is no need for restricting processing of the job with the attribute based upon the job attribute control parameter, then the job is performed without restriction (i.e., with the given job attribute), at Block 53, thus concluding the illustrated method (Block 56).

The job attribute control parameter(s) may be conceptually considered as a "default" parameter(s), meaning it is the level of restriction provided in the ordinary course of operation. However, there may be special circumstances when it is desirable to override the normal settings to provide additional flexibility in allowing print jobs with the given job attribute. That is, if for example a print job is to otherwise be restricted based upon the job attribute control parameter, the controller 22" may then determine whether to override the restriction based upon a job attribute override parameter different than the job attribute control parameter, at Block 54.

By way of example, the job attribute override parameter may include a user ID, a group ID, and/or a project priority level associated with the document processing job. As such, a particular access level associated with a given user ID (i.e., administrator or manager access) will cause the controller 22" to override normal job attribute control parameters such as time of day prohibitions, etc., as will be discussed further below. Thus, if the restriction is overridden, the job is allowed to be processed without restriction (Block 53), and otherwise is restricted from being processed with the given job attribute(s), at Block 55. The job may then be directed to a restricted job queue or re-formatted for printing without the given job parameter, for example, as discussed above.

Further copy/print job attribute control aspects will now be described. As noted above, the document processing system may be used for color access control, i.e., the ability to limit or prohibit a user's ability to print using a particular job attribute, such as color. Other attributes that a user may be prohibited from using may include binding, printing on certain type/sizes of paper, etc. The attribute control feature may be based upon several parameters, such as: the given user (e.g., based upon user ID); the given user's allocation and limits (e.g., number of pages allowed for output by budgeted amount or for a period, such as one month); date/time; volume of printing for a given job (e.g., number of pages); volume by time period (e.g., pages per hour); access permission, where such permission is determined based upon an access code or access authority; whether an expiration date for the document has passed; and whether a document version is a latest or current version (e.g., the latest version may be printed with attribute but not older versions). Various combinations of these parameters (as well as other similar parameters) may also be used, such as by user by date with a maximum weekly threshold, etc.

Certain output attributes or finishing options may be enforced based on the various parameters and criteria/business rules. For example, a given user's output may always be duplex for select output devices. Or certain attributes may only be made available to a given user, for a given printer, for a given group of users, or for a given user or group of users accessing a given printer based on certain conditions, such as that user can print in color if they select a particular print tray on a select printer or a group of users can only output simplex and color on certain dates and during select times.

Output may also be controlled by security objects embedded in the document or file "output description language," or that is referenced to or is associated with the document or file. Access may be controlled by the number of times a particular user has printed or copied the file, or by the number of times a set of or one particular attribute has been selected. Similarly embedded security objects physically present on hard outputs will determine how the hard output will be copied. For instance, the embedded security object may be required to be present and that given certain circumstances will determine further copying restrictions.

By way of example, the system may be implemented as a computer program running on one or more centralized network servers, such as in a local or wide area network environment, in which users generate document processing jobs from computers 24' (e.g., PCs, Macs, PDAs, etc.) connected (via hardwired or wireless connections) to the network. Moreover, the document processing/printing devices 21 may be color printers, color copiers, and multi-function devices (MFDs), which are devices that allow both copying and printing operations, for example, as noted above. Other similar printing devices (e.g., fax machines, etc.), that provide desired printing functionality may also be used. Software may also be installed on user computers and/or print controller 22 to perform certain of the operations of the print attribute control operations as well.

The invention will be further understood with reference to the following exemplary use case scenarios. At print initiation, (i.e., at the time a given user elects to print), the system determines the given user's color access status. If the status is enabled the user is allowed to print in color. If not, the user is notified that he cannot print to the selected color printer and why. The user then selects another printer, virtual or otherwise, that is not a color printer (e.g., black and white (B/W)), or is not a particular type of color printer (e.g., a user may be prohibited from printing to a color laser printer, but allowed to print on a color inkjet printer). Alternatively, the system may automatically execute a B/W or grayscale driver (or divert to a color inkjet printer) to perform the print/copy job in B/W after notifying the user why he cannot print in color.

Another exemplary scenario is to hold a job in a print/copy queue 25'. More particularly, a color processing job is stopped from being released for printing, and is held in the queue 25' until the user has permission to print in color. The user is notified of his status and can elect to either re-print in B/W, seek permission to print the job in color, or delete it. This dialogue can take place at the printer or multi-function device (MFD), at the computer from which the user printed the job (or another computer), or both. Another possibility is to transform a color document description language to a B/W document description language. For example, converting a color post script to a B/W PDF or PCL or XPS, or any combination thereof, the document processing job whose color attributes have been disabled or canceled is released as a B/W output, along with notification to the user.

Another option is that the price/cost of a document processing job may be shown to the user prior to being released for printing so that the user can decide at that time if they will continue to print in color or change to B/W. The price/cost information might also include budget limits or other cost specific information for the particular printer that is selected. The system may integrate directly with one or more network print drivers to allow for the display of price/cost values for printing, and to allow the user to make the appropriate decision for proceeding with printing.

Access to an output device may be controlled and limited to select users, user groups, departments, access code or any combination of a number of parameters. For example, finance department users may only print color to a select printer during select times and when they submit an authenticated project code. The access controlling parameters may change because of other events and parameters, e.g., project code access may have an expiration date or a project code may have imposed color output limits that when they are exceeded the code color output will be translated to B/W output and the user optionally notified of the change. A document processing job may be available for release at an output device by users other than the originator of the job. For example, the other users may have permission to release the job in color, and the originator may only be able to release it in B/W.

Other job attribute control features are disclosed in a co-pending patent application Ser. No. 11/971,297 filed concurrently herewith and assigned to the Assignee of the present invention entitled DOCUMENT PROCESSING SYSTEM PROVIDING JOB ATTRIBUTE CONTROL AND OVERRIDE FEATURES AND RELATED METHODS, the entire disclosure of which is hereby incorporated herein in its entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A document processing system comprising:
at least one document printing device for performing document printing jobs; and
a print control server connected to said at least one document printing device for
recording job attribute usage history based upon document printing jobs performed by said at least one document printing device with a job attribute, and
selectively restricting processing of new document printing jobs by said at least one document printing device with the job attribute based upon the recorded job attribute usage history exceeding a job attribute control threshold.

2. The document processing system of claim 1 wherein the job attribute usage history includes a project type associated with respective document printing jobs, and wherein the job attribute control threshold comprises a project output limit.

3. The document processing system of claim 1 wherein the job attribute usage history includes a number of times a given document printing job has been processed with the job attribute, and wherein the job attribute control threshold comprises an individual job output limit.

4. The document processing system of claim 1 wherein the job attribute usage history includes a number of times the job attribute has been selected by a given user, and wherein the job attribute control threshold comprises a user job attribute selection limit.

5. The document processing system of claim 1 wherein the job attribute usage history includes a number of times a user has processed a given document printing job, and wherein the job attribute control threshold comprises a user processing job limit.

6. The document processing system of claim 1 wherein the job attribute usage history includes a number of times a job is processed during a time period, and wherein the job attribute control threshold comprises a time period output limit.

7. The document processing system of claim 1 further comprising a queue; and wherein said print control server further stores restricted document printing jobs having the job attribute in the queue for processing at a later time.

8. The document processing system of claim 1 wherein said at least one document printing device comprises a scanner.

9. The document processing system of claim 1 further comprising at least one computer connected with said print control server and said at least one document printing device in a network for generating document processing jobs.

10. The document processing system of claim 1 wherein the job attribute comprises at least one of color processing, binding, and paper size.

11. A document processing system comprising:
  a plurality of document printing devices for performing print jobs;
  at least one computer for generating print jobs; and
  a print control server connected with said document printing devices and said at least one computer in a network for
    recording color printing usage history based upon print jobs performed by said document printing devices with color, and
    selectively restricting printing of new print jobs by said at least one document printing device with color based upon the recorded color printing usage history exceeding a color printing control threshold.

12. The document processing system of claim 11 wherein the color printing usage history includes a project type associated with respective print jobs, and wherein the color printing control threshold comprises a project output limit.

13. The document processing system of claim 11 wherein the color printing usage history includes a number of times a given print job has been printed with color, and wherein the color printing control threshold comprises an individual print job output limit.

14. The document processing system of claim 11 wherein the color printing usage history includes a number of times color printing has been selected by a given user, and wherein the job attribute control threshold comprises a user color printing selection limit.

15. The document processing system of claim 11 wherein the color printing usage history includes a number of times a user has printed a given print job, and wherein the color printing control threshold comprises a user print job limit.

16. The document processing system of claim 11 wherein the color printing usage history includes a number of times a print job is printed during a time period, and wherein the color printing control threshold comprises a time period output limit.

17. A document processing method comprising:
  generating document printing jobs to be performed by at least one document printing device;
  recording job attribute usage history based upon document printing jobs performed by the at least one document printing device with a job attribute; and
  selectively restricting printing of new document printing jobs by the at least one document printing device with the job attribute based upon the recorded job attribute usage history exceeding a job attribute control threshold.

18. The method of claim 17 wherein the job attribute usage history includes a project type associated with respective document printing jobs, and wherein the job attribute control threshold comprises a project output limit.

19. The method of claim 17 wherein the job attribute usage history includes a number of times a given document printing job has been processed with the job attribute, and wherein the job attribute control threshold comprises an individual job output limit.

20. The method of claim 17 wherein the job attribute usage history includes a number of times the job attribute has been selected by a given user, and wherein the job attribute control threshold comprises a user job attribute selection limit.

21. The method of claim 17 wherein the job attribute usage history includes a number of times a user has printed a given document printing job, and wherein the job attribute control threshold comprises a user document printing job limit.

22. The method of claim 17 wherein the job attribute usage history includes a number of times a document printing job is processed during a time period, and wherein the job attribute control threshold comprises a time period output limit.

23. A non-transitory computer-readable medium having computer-executable instructions for causing a computer to perform steps comprising:
  recording job attribute usage history based upon document printing jobs performed by at least one document printing device with a job attribute; and
  selectively restricting printing of new document printing jobs by the at least one document printing device with the job attribute based upon the recorded job attribute usage history exceeding a job attribute control threshold.

24. The non-transitory computer-readable medium of claim 23 wherein the job attribute usage history includes a project type associated with respective document printing jobs, and wherein the job attribute control threshold comprises a project output limit.

25. The non-transitory computer-readable medium of claim 24 wherein the job attribute usage history includes a number of times a given document printing job has been processed with the job attribute, and wherein the job attribute control threshold comprises an individual job output limit.

26. The non-transitory computer-readable medium of claim 23 wherein the job attribute usage history includes a number of times the job attribute has been selected by a given user, and wherein the job attribute control threshold comprises a user job attribute selection limit.

27. The non-transitory computer-readable medium of claim 23 wherein the job attribute usage history includes a number of times a user has processed a given document printing job, and wherein the job attribute control threshold comprises a user document processing job limit.

28. The non-transitory computer-readable medium of claim 23 wherein the job attribute usage history includes a number of times a document printing job is processed during a time period, and wherein the job attribute control threshold comprises a time period output limit.

\* \* \* \* \*